E. WHITELEY.
Cooking Range.
No. 50,977.
Patented Nov. 14, 1865.
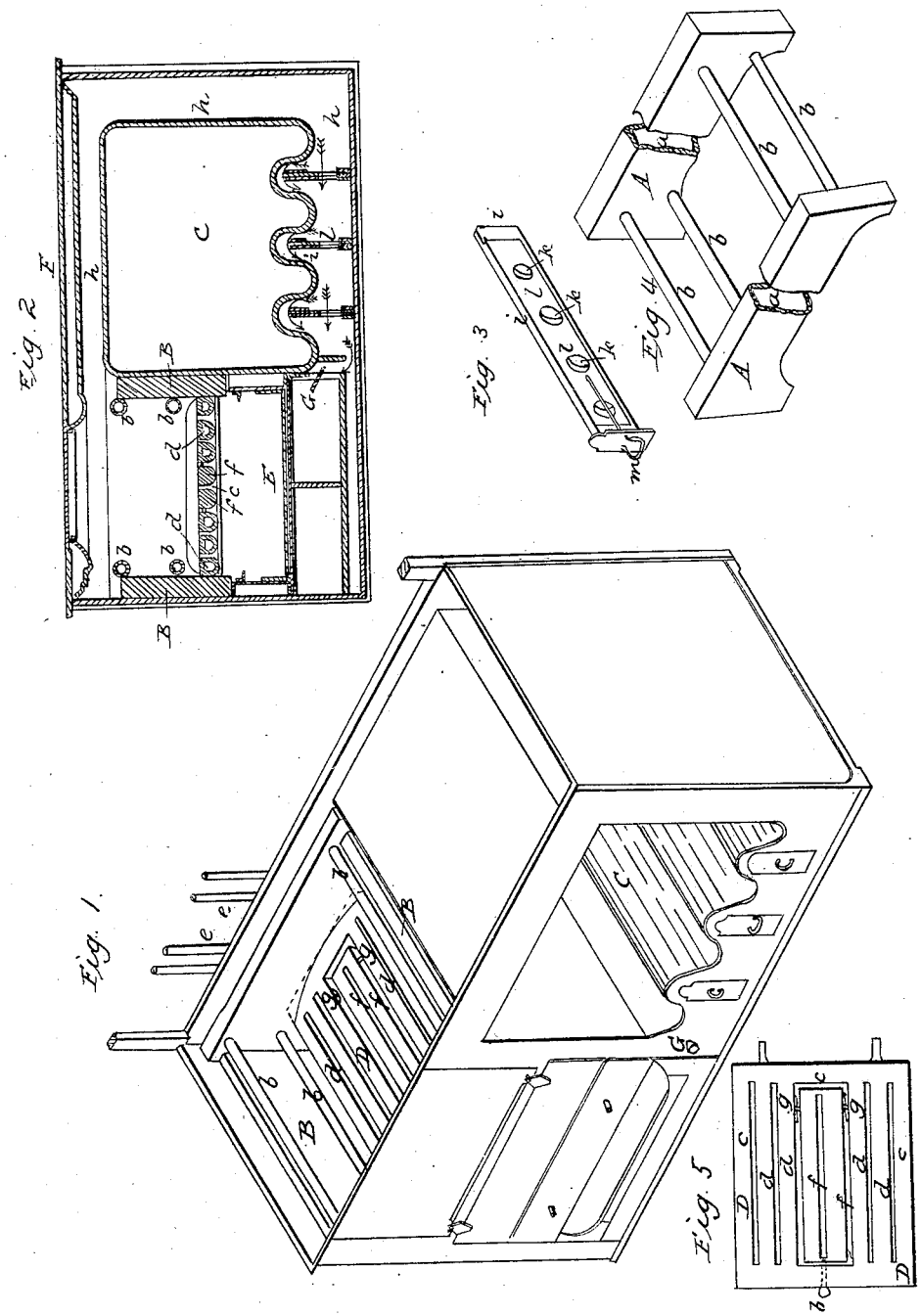

UNITED STATES PATENT OFFICE.

EDWARD WHITELEY, OF CAMBRIDGE, MASSACHUSETTS.

IMPROVEMENT IN RANGES.

Specification forming part of Letters Patent No. 50,977, dated November 14, 1865.

*To all whom it may concern:*

Be it known that I, EDWARD WHITELEY, of Cambridge, in the county of Middlesex and State of Massachusetts, have invented an Improved Cooking Apparatus, of which the following is a full, clear, and exact description, reference being had to the accompanying drawings, making part of this specification, in which—

Figure 1 is a perspective view of my improved cooking apparatus, the top plate being removed. Fig. 2 is a vertical longitudinal section through the same with the top plate in place; Figs. 3, 4, and 5, details to be referred to.

The ovens of cooking apparatus have in some cases been constructed with a corrugated bottom, so as to increase the amount of heating-surface; but one of the sides of the flues of these ovens has always been straight or flat.

My invention consists in making the oven-flues of a curved or wave-like form, thereby not only producing a greater amount of heating-surface, but increasing the length of the flue and causing the products of combustion and heated air to be retained for a longer time in contact with the bottom or sides of the oven, by which means the article within it may be cooked or baked in a much less time than has heretofore been found practicable.

Where the fire-pot is constructed with a water-space on all sides very little heat is communicated directly to that side of the oven adjoining the fire, to overcome which difficulty is the object of the second part of my invention, which consists in leaving open a portion of the side of the fire-pot adjoining the oven for the reception of a lining of fire-brick or its equivalent, so as to allow the heat of the fire to be transmitted directly through the lining to the oven, causing it to be heated much more rapidly than when the fire was entirely surrounded by water on all sides.

To enable others skilled in the art to understand and use my invention, I will proceed to describe the manner in which I have carried it out.

In the said drawings, A represents the fire-pot, the front and back of which is made hollow, forming water-spaces $a$, which are connected by the circulating-pipes $b$, outside of which (and forming the alternate sides of the fire-pot) are placed pieces of soapstone or other suitable material, B, which allow the heat to be transmitted directly through to the oven C, thereby causing it to be more rapidly heated. In practice the apparatus is furnished with two ovens, one on each side of the fire-pot.

D is the grate, the portion $c$ and some of the grate-bars $b$ of which are made hollow, and are connected by circulating-pipes $e$ with a bath-boiler, (not shown in the drawings,) by which means the water is allowed to circulate through the grate D. A part of the grate-bars $f$, in the center, is made solid, being connected at the ends, and are hinged at $g$, Figs. 1 and 5, the opposite end being supported by a pin, 6, which, on being withdrawn, allows the bars $f$ to drop and deposit the ashes in the ash-pit E.

F is the top plate, which is provided with pot-holes in the usual manner.

The bottom of the oven C is made corrugated for the purpose of affording a greater amount of heating-surface, and forms one side of that portion of the flue $h$ which is beneath the oven.

$i$ are metal plates, which slide in suitable guides and extend across the bottom of the oven, thereby giving a circuitous or undulating form to the flue, which increases its length and serves to impede the passage of the products of combustion or heated air and causes them to be retained for a longer time in contact with the bottom of the oven, whereby the operation of cooking or baking is performed more rapidly than heretofore.

Each of the metal plates $i$ is provided with holes $k$, which are opened or closed by the sliding plate $l$, also provided with corresponding holes, (see Fig. 3,) and operated by the handle $m$. When the fire is first kindled or when a quicker draft is required the plate $l$ is pushed in so as to uncover the holes $k$ in the plate $i$, which causes the draft to take a direction as indicated by the red arrows, and when it is required to create a stronger heat under the bottom of the oven the holes are closed, causing the draft to take the direction indicated by the blue arrows. (See Fig. 2.)

G is a damper or draft-regulator, by which the fire is regulated as required. The products of combustion pass through the opening commanded by this damper into a space beneath the ash-pit, and thence by a flue (not shown in the drawings) into the chimney.

The plates $i$ and $l$ may be entirely withdrawn from the flue to allow of its being cleaned.

Instead of the bottom only of the oven-flue being made undulating, as described, any other portion or the whole of the flue may be made undulating, if desired, without departing from the spirit of my invention.

What I claim as my invention, and desire to secure by Letters Patent, is—

1. An oven-flue of an undulating or wave-like form, substantially as described, for the purpose set forth.

2. The arrangement and application of the fire-pot A, having a portion of that side contiguous to the oven left open for the reception of a lining of fire-brick or its equivalent, and constructed substantially as set forth.

E. WHITELEY.

Witnesses:
N. W. STEARNS,
P. E. TESCHEMACHER.